July 21, 1970 D. F. GREEN ET AL 3,521,343
METHOD FOR MANUFACTURING THIN WALLED FLEXIBLE BEARING LINERS
Filed Jan. 12, 1968
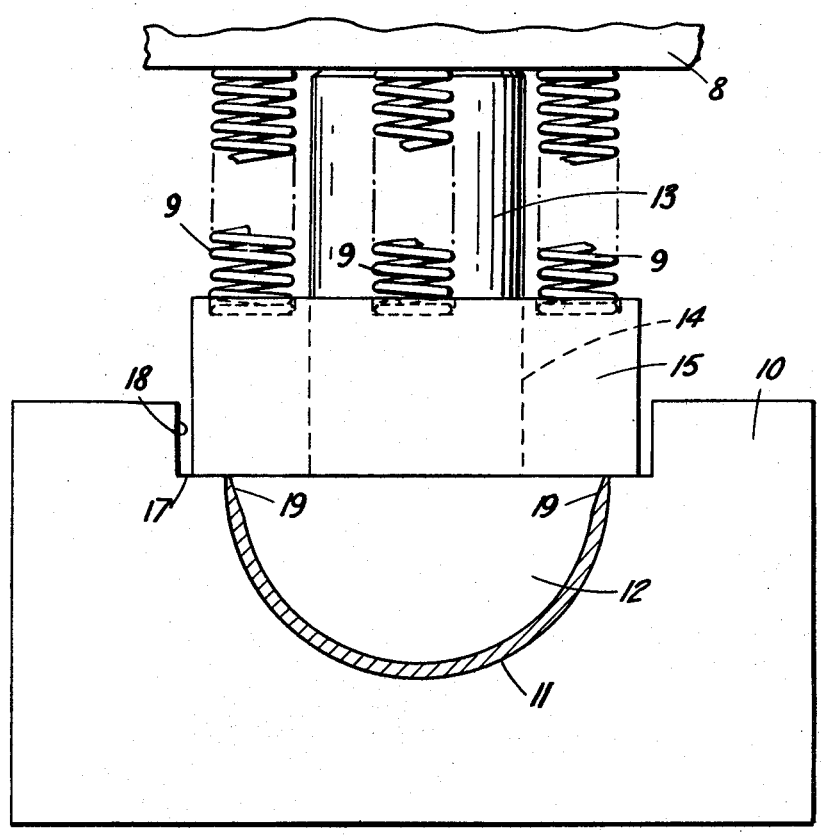

3,521,343
METHOD FOR MANUFACTURING THIN WALLED FLEXIBLE BEARING LINERS
David Frederick Green, London, Norman Ernest Fisher, Harrow, and John Whiteside, Naphill, England, assignors to Vandervell Products Limited, London, England, a British company
Filed Jan. 12, 1968, Ser. No. 697,340
Claims priority, application Great Britain, Jan. 16, 1967, 2,252/67
Int. Cl. B21d *1/00, 53/10;* B21k *3/00*
U.S. Cl. 29—149.5                                           7 Claims

ABSTRACT OF THE DISCLOSURE

The invention provides a method for making thin walled flexible bearing liners from arcuate blanks which comprise a backing layer having a layer of bearing material on the internal surface thereof which method comprises subjecting the blanks to two successive coin-pressing operations one of which imparts a finished external surface of the required circumferential length to the blanks and the other of which sizes the internal surface of the blanks.

---

This invention relates to a method and apparatus for manufacturing thin wall flexible bearing liners (i.e. parts of split bearings) and particularly, but not exclusively, to the kind of method and apparatus described in U.S. patent application No. 641,945, filed May 29, 1947.

An object of the invention is to avoid the necessity of machining the inner surface of the formed bearing liner to bring it to a required radial dimension.

According to this invention a method of making thin walled flexible bearing liners from metal strip consists in forming from the strip arcuate blanks and subjecting the blanks to two successive coin pressing operations one of which imparts a finished external surface of the required circumferential length whilst leaving the internal surface unfinished and the other of which imparts a finished external surface of required curvature. Preferably the circumferential length of the blank is controlled during the second depressing operation. Each arcuate blank may have a volume substantially equal to that of the finished liner so that after the two coin pressing operations the finished liner has the required axial length. In any of the methods referred to above at least one oil hole may be formed in the bearing liner.

In any of the above methods external and/or internal chamfers may be formed on the blank prior to the pressing operation.

Also in any of the above methods a locating projection may be formed on the bearing liner.

An appaartus for carrying out any one of the above methods may comprise a press mechanism for carrying out the first coin pressing operation containing a tool having a female part, the concave surface of which is appropriate for the circumferential length of the finished liner and having a male part so shaped as to engage only a part of the arcuate blank necessary for forcing it into the female part and which male part has associated therewith abutment faces which engage the parting faces of the blank towards the end of the pressing operation and a press mechanism containing a tool for carrying out the second coin pressing operation having male and female surfaces which extend over the whole area of the previously pressed bearing liner and which tool has other surfaces which engage the parting faces of the liner and which maintain the correct circumferential length of the liner which has been imparted to it by the first coin pressing operation.

The composite strip may be a bi-metal strip consisting of a backing layer and a layer of bearing material. Alternatively the composite strip may be a tri-metal strip consisting of a backing layer, an intermediate layer of a bearing material and a layer of tin alloy, lead indium alloy or lead tellurium alloy.

A method and apparatus for forming thin wall flexible bearing liners are describde and claimed in the specification accompanying U.S. patent application No. 641,945. In that specification there is described and illustrated a press mechanism in which are located a succession of tools for carrying out operations on a strip of bearing material. Tools are provided for the following operations; indenting the flat strip along lines across its width and opposite faces thereof to form chamfers, partially severing the strip across its width from opposite edges thereof and simultaneously bending the unsevered portion of the strip, completing the bending of the strip into arcuate formation in one or more stages, bringing the circumferential distances between the parting faces at the ends of the arcuate formation to an accurate and predetermined dimension and bringing the outer surface of the liner to the finished dimension and contour, rounding the inner edges of the parting faces, piercing one or more oil holes with or without depressions around them and finally severing the arcuate portions and forming locating projections upon them.

The following is a description of one form of tool for pressing the internal surface of a formed severed blank tool comprising a female part 10 having a half cylindrical concavity 11 the dimensions of which may correspond with the external dimensions of the already formed blank. The male portion of the tool comprises a half cylindrical head 12, the dimensions of the convex face of which correspond with the dimensions required for the internal surface of the finished bearing liner. Projecting from the upper flat face of the head is a stem 13 which passes through a hole 14 in a block 15 of metal and is surrounded by a number of helical compression springs 9 which at one end abut the upper face of the block and at the other end abut a platen 8 of the press. The underface 16 of the block is flat and when the bearing liner is being formed rests on a shoulder 17 at the bottom of a recess 18 in the tool part 10. The press in which the tool is used may be of the kind in which the length of the stroke can be accurately controlled so that downward movement of the upper platen of the press ceases when the flat face of the head 12 is slightly below the shoulder 17. When the pressure on the stem 13 is relieved by the upward movement of the platen 8 of the press the resilience of the material of the bearing liner will cause the head 12 to rise bringing its flat face level with the shoulder 17. The stiffness of the spring 9 is chosen so as to resist the upward movement of the parting faces maintaining them level with the shoulder 17. When these conditions prevail the distance between the convex surface of the head and the concave surface of the female tool part corresponds to the required thickness of the finished bearing liner. In the case where relief is required at the location where the internal concave surface of the bearing liner meets the parting faces, the head is appropriately shaped at the locality indicated at 19.

As previously indicated instead of providing a separate block 15 which overlies the parting faces the head 12 could be formed integrally with a shoulder.

Suitable ejection means (not shown) are provided to remove the pressed bearing from the die.

It may be desirable for the thickness of the continuous strip, from which the blanks are formed, to gradually decrease towards its lateral edges.

The invention is particularly applicable where the strip from which the bearing liners are formed is a multi-layer strip, for example a strip having a steel backing supporting a bearing metal which may comprise an intermediate layer of lead-bronze, aluminium-tin or other alloy and a final thin bearing layer of tin based or lead based alloy particularly the three layer strip described in British patent specification No. 989,946 although a bimetallic strip may be employed.

In the case where the operations on the liner, prior to the removal of irregularities in the internal surface of the liner by a pressing operation, include forming oil grooves or oil holes in the internal surface, forming internal chamfers and rounded internal ends, and such holes, grooves, chamfers and rounded internal ends may be made large enough to provide space for the extrusion of some bearing layer material during the final pressing operation.

It will be appreciated that prior to the final pressing operation all the faces of the bearing liner will have been brought substantially to their required final dimensions.

We claim:

1. A method of making thin walled flexible bearing liners from arcuate blanks which comprise a backing layer having a layer of bearing material on the internal surface thereof which method comprises subjecting the blanks to two coin-pressing operations one of which imparts a finished external surface of the required circumferential length whilst leaving the internal surface unfinished and the other of which sizes the internal surface of the blanks wherein the improvement comprises carrying out the coin-pressing operations successively.

2. A method as claimed in claim 1 in which the first coin-pressing operation is carried out on the external surface of the blank and the second coin-pressing operation on the internal surface of the blank and the circumferential length of the blank is maintained constant during the second coin-pressing operation so that the second coin-pressing operation does not upset the required circumferential length achieved by the first operation.

3. A method as claimed in claim 2 in which each arcuate blank has a volume substantially equal to that of the finished liner so that after the two coin-pressing operations the finished liner has the required axial length.

4. A method as claimed in claim 1 in which at least one oil hole is formed in the arcuate blank.

5. A method as claimed in claim 1 in which a chamfer is formed along at least one edge of the blank into which bearing material can extrude during the coin-pressing operation of the internal surface of the blank.

6. A method as claimed in claim 1 wherein a locating projection is formed on the blank for locating the blank in a housing.

7. A method as claimed in claim 1 wherein the composite strip is a strip consisting of a backing layer, a layer of a bearing material and an overlay of lead alloy.

References Cited

UNITED STATES PATENTS

| | | | |
|---|---|---|---|
| 1,783,438 | 12/1930 | Landers | 29—149.5 |
| 2,031,982 | 2/1936 | Salzman | 29—149.5 |
| 3,206,830 | 9/1965 | Hart et al. | 29—149.5 |
| 3,262,299 | 7/1966 | Hart et al. | 72—130 |
| 2,618,050 | 11/1952 | Thomas | 29—149.5 |

THOMAS H. EAGER, Primary Examiner

U.S. Cl. X.R.

72—130